Patented Sept. 3, 1940

2,213,647

UNITED STATES PATENT OFFICE 2,213,647

METALLIZED ACID POLYAZO DYES

Moses L. Crossley, Plainfield, and Lincoln M. Shafer, Upper Montclair, N. J., assignors, by mesne assignments, to American Cyanamid Company, New York, N. Y., a corporation of Maine No Drawing. Application June 26, 1937, Serial No. 150,540

5 Claims. (Cl. 260—145)

This invention relates to metallized polyazo dyes which show excellent fastness to light and more particularly polyazo dyes metallized with copper.

The metallized dyes of the present invention are obtained by forming the complex copper compound of a polyazo dye having a middle component which is a dihydroxy aryl compound capable of combining with two molecules of diazo compounds in positions ortho to the two hydroxyl groups, at least one of the diazo compounds having a metallizable group such as a hydroxyl or carboxyl group ortho to the azo group and at least one end component containing a solubilizing group. The dyes may be represented by the following general structural formula:

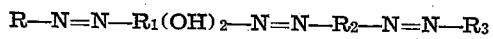

$$R-N=N-R_1(OH)_2-N=N-R_2-N=N-R_3$$

in which $R_1$ is a radical of the naphthalene series and R, $R_2$ and $R_3$ are aryl compounds and the hydroxy groups on $R_1$ are ortho to the two azo groups, at least one of the radicals R and $R_2$ having a metallizable group such as a hydroxyl or carboxyl ortho to the azo group connecting the radical to R and at least one of the groups R and $R_3$ having a solubilizing group.

In carrying out the present invention, the polyazo dyes are metallized with copper or combinations of copper and other metals such as copper-chromium, copper-vanadium, copper-zinc, copper-iron, and the like. The combinations of copper with the other metals react with the dye to produce products which are not identical with the mixture of the products obtained by treating portions of the dye with separate metals. The metallic combination or complex enters into the dye molecule in some manner which is different from the reaction of a single metal. The precise form of chemical combination has not as yet been determined.

The ratio of the metal or metal complex to the dye may vary within wide limits and may depend on the nature of the metal and the number and nature of the metallizable groups in the dye molecule. Where more than one metal is to enter the molecule of the dye, it is, of course, necessary that there be a plurality of pairs of metallizable groups. Such cases would correspond to a species under the general formula in which both R and $R_2$ contain hydroxyl or carboxyl groups ortho to the azo groups.

The present invention is not limited to a particular process of producing the dyes. Normally they will be prepared by coupling the dihydroxy compound with a diazo compound and a diazoazo compound. Of course, the polyazo dyes may be produced by successive couplings of diazoamino compounds which are then rediazotized and further coupled. The end components may be the same or different.

Metallization is effected in the normal manner, for example, by refluxing an aqueous solution of the dye with copper salts or other suitable compounds of copper or mixtures with other metal salts or compounds.

In general, the new dyes are dark colored powders which are quite soluble in water and are capable of producing valuable colors of varied tones when dyed from an acid bath on wool, silk, leather and furs. The dyes show good to excellent fastness to light, washing, fulling, acid, alkalies and sea water. The degree of fastness will vary with the particular dyes and with the metals used.

The invention will be described in detail in the following examples but it should be understood that the invention is not limited to the details therein set forth.

Example 1

160 parts of 1-5 dihydroxy naphthalene is suspended in 2500 parts of water and 400 parts of soda ash is added. The solution is cooled with ice to 5–10° C. and then mixed with the diazo product obtained from 189 parts of 2 amino phenol 4 sulfonic acid. The mixture is stirred until coupling is complete. Then the diazo compound obtained from 307 parts of the dye produced by coupling para amino salicyclic acid with alpha naphthylamine in acid solution is added. Sufficient sodium carbonate to have the reaction alkaline throughout the coupling is added. Then the mixture is stirred until the second coupling is complete. The reaction must be alkaline throughout the coupling. The mixture is then made acid to Congo and the dye salted out with sodium chloride. The dye is filtered and the paste suspended in 6000 parts of water and treated with 250 parts of copper sulfate, then the mixture is boiled for several hours. The resulting dye is then salted out with sodium chloride. It is soluble in water and dyes animal fibers black. Other metals mentioned in the specifications may be substituted for copper and similar metallized products obtained.

The formula for the dye prior to metallization is as follows:

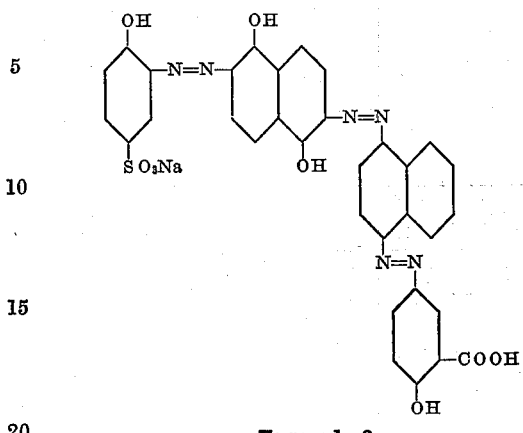

Example 2

Dissolve one molecular weight of the dye shown in the formula below in 8 to 10 times its weight of water. Add 1½ molecular weights of sodium acetate and an equivalent amount of copper sulfate. Adjust the pH to 3½, boil for 5 hours, salt out the dye with sodium chloride, filter and dry. The product is a dark powder, soluble in water, and giving dark tones of blue.

The formula for the dye prior to metallization, is as follows:

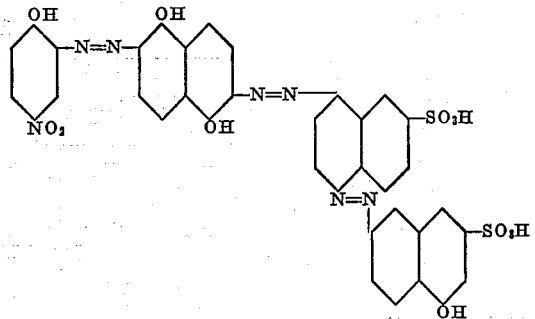

The following table illustrates further dyes which can be produced according to the present invention:

*Table of types of dye*

| First component | Middle component | Second component | Color produced by metallized product, Cu |
|---|---|---|---|
|  |  | 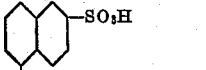 | Black. |
| 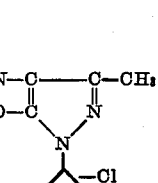 |  |  | Green. |
| 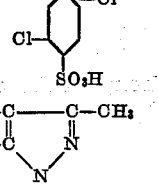 |  |  | Yellowish brown. |
| 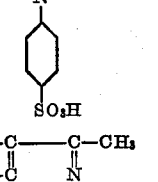 |  |  | Blue. |
| 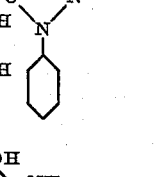 |  | 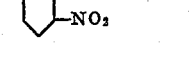 | Blue. |

| First component | Middle component | second component | Color produced by metallized product, Cu |
|---|---|---|---|
| (structure) | (structure) | (structure) | Blue |
| (structure) | (structure) | (structure) | Reddish blue. |
| (structure) | (structure) | (structure) | Green. |
| (structure) | (structure) | (structure) | Reddish blue. |
| (structure) | (structure) | (structure) | Reddish brown. |
| (structure) | (structure) | (structure) | Blue. |
| (structure) | (structure) | (structure) | Red. |
| (structure) | (structure) | (structure) | Dark blue. |

This application is in part a continuation of our copending application Serial No. 676,318, filed June 17, 1933 now Patent 2,136,650 of November 15, 1938.

We claim:

1. Complex copper compounds of azo dyes, the azo dye component of which has the following formula:

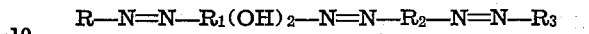

in which the radicals R, $R_2$ and $R_3$ are aryl radicals, $R_1$ is a naphthyl radical having the hydroxyls ortho to the two azo groups, at least one of the radicals R and $R_2$ having a metallizable group ortho to the azo group connecting the radical to $R_1$, and at least one of the radicals R and $R_3$ containing a solubilizing group.

2. A complex copper compound of the dye according to claim 1 in which both R and $R_2$ contain a metallizable group ortho to the azo groups connecting the radicals to the dihydroxynaphthalene radical.

3. A complex copper compound of a dye according to claim 1 in which $R_3$ is an aryl azo-aryl radical.

4. A complex copper compound of a dye according to claim 1 in which $R_3$ is an aryl radical free from azo groups other than the azo group connecting it to $R_2$.

5. A complex copper compound of the azo dye having the following formula

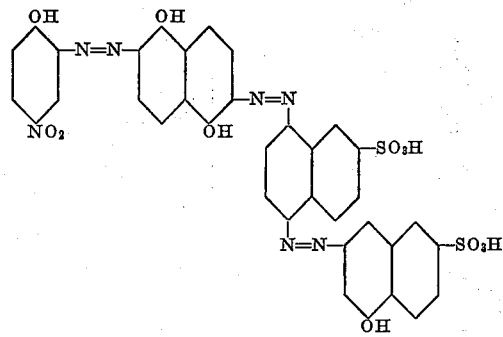

MOSES L. CROSSLEY.
LINCOLN M. SHAFER.

Certificate of Correction

Patent No. 2,213,647.  September 3, 1940.

MOSES L. CROSSLEY ET AL.

It is hereby certified that error appears in the printed specification of the above numbered patent requiring correction as follows: Page 4, second column, line 21, claim 5, for that portion of the formula reading

and that the said Letters Patent should be read with this correction therein that the same may conform to the record of the case in the Patent Office.

Signed and sealed this 8th day of October, A. D. 1940.

[SEAL]

HENRY VAN ARSDALE,
*Acting Commissioner of Patents.*